Oct. 30, 1923.
J. A. LA VIERS
1,472,302
BRAKE
Filed May 31, 1921
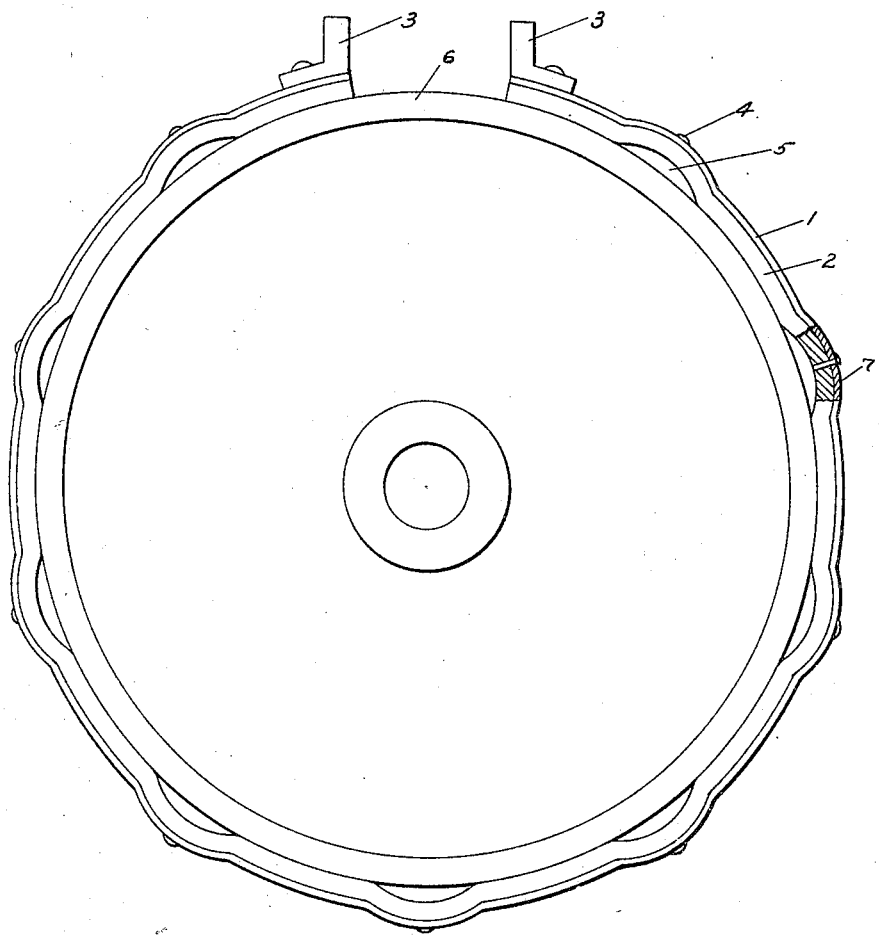
James A La Viers Inventor
By Robert G Smith
Attorney Patented Oct. 30, 1923.

1,472,302

UNITED STATES PATENT OFFICE.

JAMES A. LA VIERS, OF PORTLAND, OREGON.

BRAKE.

Application filed May 31, 1921. Serial No. 473,849.

*To all whom it may concern:*

Be it known that I, JAMES A. LA VIERS, a citizen of the United States, residing at Portland, in the State of Oregon, have invented a new and useful improvement in brakes to be used upon automobiles or in any other machine where a brake is used or required upon a revolving cylinder or hub.

This invention relates to an improved brake band and one object of the invention is to provide a brake band which may be used in connection with a brake drum positioned in an oil bath, it being understood that the same construction could be made use of in connection with a transmission drum as well as in connection with a brake drum.

Another object of the invention is to provide a brake band having an improved construction which will permit of the band being brought into an operative position and apply a very strong gripping action against the brake drum without danger of heating which would cause the lining of the band to be burnt out.

Another object of the invention is to so construct this brake band that when the lining is put in place, it may be secured to the inner face of the band in a very efficient manner with the portions of the band which extend across outwardly bowed portions of the band engaged by rivets passing through these outwardly bowed portions of the band and thus the inner end portions of the rivets held out of engagement with the face of the brake drum.

Another object of the invention is to provide a brake band which will not only be constructed to permit oil to pass between the band and drum and prevent the securing rivets from engaging the drum but which will further be so constructed that squeaking and chattering of the brakes will be prevented.

Another object of the invention is to provide a brake band which will be simple in construction and cheap to produce and very strong and durable when in use.

This invention is illustrated in the accompanying drawing, wherein there is disclosed in elevation a brake drum of a conventional construction having the improved brake band shown thereon.

This improved brake band which is indicated by the numeral 1 is formed from a strip of tempered spring steel and will be of sufficient length to extend about the brake drum which is indicated in general by the numeral 6. This brake band is crimped at points spaced as shown in the drawing thus providing offset portions or pockets 7. These offset portions serve not only to provide pockets but further serve to permit the springs to have give longitudinally when the brake is applied. Therefore, the band may be drawn into tight engagement with the brake drum but ordinarily will be held out of engagement with it. A lining 2 which is formed of any suitable material desired, fits against the inner face of the brake band and is secured to the inner face thereof by rivets 4 which pass through the lining and through the offset portions 7 of the band. By having the rivets pass through the offset portions, the inner ends of the rivets are prevented from engaging the rim of the drum and further this causes the lining to extend into the recesses 7 and thus provide spaces 5 between the drum and lining. Therefore, when the end portions of the band are drawn towards each other by suitable means and will engage the lugs 3 at the ends of the band, oil may pass through these spaces 5 to keep the drum and lining well lubricated and prevent overheating which would be liable to cause the lining to be burnt out.

What is claimed is:

1. A brake band formed of a strip of spring metal rectangular in transverse cross section at all points, said strip being bent at points throughout its length to provide outwardly bowed portions, a lining fitting against the inner face of said band, and fasteners passing through the lining and outwardly bowed portions of the band to draw the lining into the bowed portions of the band and provide spaces between the lining and a brake drum when the end portions of the band and lining are drawn towards each other with the portions of the lining between the spaces tightly engaging the drum.

2. A brake band formed of a strip of resilient material of uniform transverse cross section at all points, said strip being bent at points throughout its length to provide outwardly bowed portions, and a lining fitting against the inner face of the band and extending into the bowed portions, the bowed portions of the band providing spaces between the lining and a brake drum when the end portions of the band and lining are drawn towards each other with the portions of the lining between the spaces tightly engaging the drum.

JAMES A. LA VIERS.